United States Patent [19]

Udagawa et al.

[11] Patent Number: 4,938,488
[45] Date of Patent: Jul. 3, 1990

[54] STEEL LAMINATE GASKET WITH WIDE SEALING AREA

[75] Inventors: Tsunekazu Udagawa, Ichikawa; Susumu Inamura, Tokyo, both of Japan

[73] Assignee: Ishikawa Gasket Co., Ltd., Tokyo, Japan

[21] Appl. No.: 243,528

[22] Filed: Sep. 12, 1988

[51] Int. Cl.$^5$ .............................................. F16J 15/08
[52] U.S. Cl. ................................ 277/235 B; 277/200; 277/236
[58] Field of Search ............. 277/235 B, 200, 213, 277/235 R, 231, 232, 233, 234, 213, 236

[56] References Cited

U.S. PATENT DOCUMENTS

| | | | |
|---|---|---|---|
| 1,815,602 | 7/1931 | Russell | 277/235 B |
| 1,846,402 | 2/1932 | Oven | 277/232 |
| 1,911,226 | 5/1933 | Fitzgerald | 277/231 |
| 1,982,759 | 12/1934 | Rosen | 277/235 B |
| 2,034,610 | 3/1936 | Dickson | 277/235 B X |
| 2,130,110 | 9/1938 | Victor et al. | 277/232 |
| 3,567,234 | 3/1971 | Skrycki | 277/235 B |
| 3,738,558 | 6/1973 | Colwell | 277/235 B |
| 4,254,963 | 3/1981 | Skrycki | 277/235 R |
| 4,759,585 | 7/1988 | Udagawa | 277/235 B |

FOREIGN PATENT DOCUMENTS 2818472 10/1979 Fed. Rep. of Germany ... 277/235 B

Primary Examiner—Allan N. Shoap
Assistant Examiner—Jeffrey J. Hohenshell
Attorney, Agent, or Firm—Kanesaka and Takeuchi

[57] ABSTRACT

A steel laminate gasket of the invention is installed in an internal combustion engine having at least one hole therein. The gasket comprises a first plate having at least one first hole therein corresponding to the hole of the engine, and a second plate having at least one second hole. The first plate is provided with a base portion, at least one curved portion adjacent the first hole, and at least one flange situated parallel to the base portion. The base portion, curved portion and flange are integrally formed together. At least one side wall is formed on one of the base portion and the flange adjacent the curved portion to surround the first hole. The thickness between the flange and base portion inside the side wall is greater than the thickness between the flange and base portion outside the side wall so that an embossed portion is formed around the first hole. The second plate is situated adjacent the first plate so that the second plate does not pile the flange of the first plate.

14 Claims, 3 Drawing Sheets

STEEL LAMINATE GASKET WITH WIDE SEALING AREA

BACKGROUND OF THE INVENTION AND RELATED ART STATEMENT

The present invention relates to a steel laminate gasket for an internal combustion engine, which can provide wide and high sealing pressure to securely seal around a hole.

The steel laminate gasket of the present invention may be used widely, such as a regular gasket situated between two engine blocks, cylinder head gasket and manifold gasket. When the gasket of the present invention is used as a cylinder head gasket, the gasket may seal around cylinder holes Hc, water holes Hw, oil holes Ho, bolt holes Hb and the like, as shown in FIG. 1. However, it is preferably to seal around a relatively large hole, such as a cylinder hole Hc.

In a gasket, a main subject of a gasket is to securely seal around a hole. Therefore, when a gasket is designed, attention has been paid how a portion around a hole is securely sealed. In this respect, there have been proposed many methods.

One of conventional methods to seal around a hole is to form a bead around a hole. As shown in FIG. 2, for example, a gasket 20 comprises an upper plate 21, a lower plate 23, and a middle plate 22 having a bead 22a around a cylinder hole Hc. In the gasket 20, the bead 22a only provides a sealing pressure around the cylinder hole Hc. Therefore, fluid passing through the hole Hc may permeate through the plates. The sealing ability of the gasket 20 is not good.

In view of the prior art, a gasket 25 as shown in FIG. 3 has been proposed in Ser. No. 193,215 filed on May 11, 1988. The gasket 25 comprises an upper plate 26 with a curved portion 26a and a flange 26b, and a lower plate 27. The gasket 25 can securely seal around the hole Hc. However, since an area around the hole Hc is only sealed by the curved portion 26a, the sealing area that forms sealing pressure is relatively narrow. Further, since the curved portion may strongly abut against the engine blocks, in case the engine blocks are formed of aluminum alloy, the engine blocks may deform at the curved portion. Therefore, a gasket with relatively wide sealing area without affecting the engine blocks has been desired.

Accordingly, one object of the present invention is to provide a steel laminate gasket, which can provide wide and high sealing pressure around a hole to be sealed.

Another object of the present invention is to provide a steel laminate gasket as stated above, which does not cause any damage to portions abutting against the gasket.

A further object of the present invention is to provide a steel laminate gasket as stated above, which can be easily and economically manufactured.

Further objects and advantages of the invention will be apparent from the following description of the invention.

SUMMARY OF THE INVENTION

In accordance with the present invention, a steel laminate gasket is designed to be installed in an internal combustion engine having at least one hole therein. The gasket comprises a first plate having at least one first hole corresponding to the hole of the engine, and a second plate situated adjacent to the first plate.

The first plate is provided with a base portion, at least one curved portion for defining the first hole, and a flange located above the base portion. The curved portion and flange are integrally formed with the base portion. The first plate is further provided with at least one side wall formed on either the base portion or the flange adjacent the curved portion to surround the first hole. The side wall may be formed diagonally or perpendicularly relative to the base portion or the flange that the side wall is not formed.

The thickness between the flange and base portion inside the side wall is greater than the thickness between the flange and base portion outside the side wall. Therefore, an area around the first hole surrounded by the side wall and the curved portion forms an embossed portion.

The embossed portion is substantially flat and parallel to the base portion or the flange facing against the embossed portion. When the gasket is tightened, the embossed portion forms a plurality of corrugated beads thereat to thereby securely seal around the first hole.

The second plate is situated at a flange side of the first plate and is provided with at least one second hole therein. The diameter of the second hole is larger than the outer diameter of the flange. Therefore, when the first and second plates are assembled, the flange is located inside the second hole.

In the gasket of the invention, outer plates may be formed to protect the first and second plates. Further, a plate having a bead may be installed between the first and second plates, wherein the bead is located under the embossed portion.

DETAILED DESCRIPTION OF PREFERRED EMBODIMENTS

Figure 1:
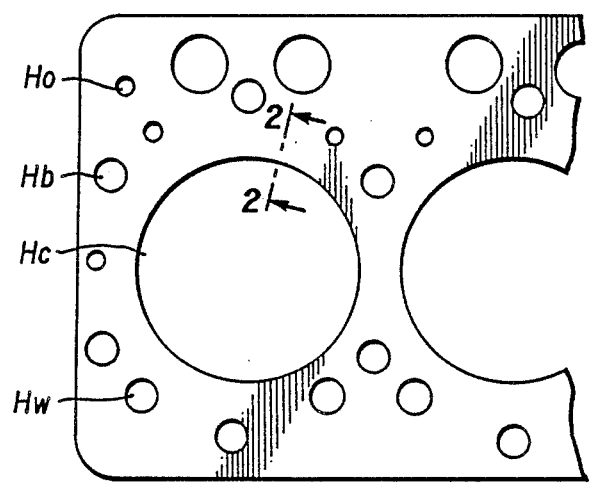
FIG. 1 is a partial plan view of a conventional steel laminate gasket.
Figure 2:
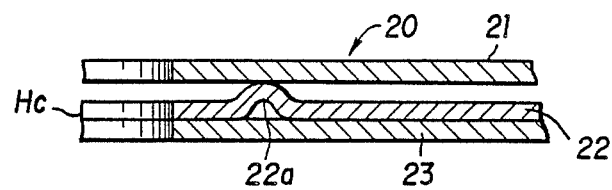
FIG. 2 is an enlarged section view taken along a line 2—2 in FIG. 1.
Figure 3:
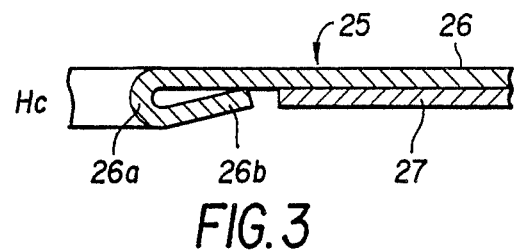
FIG. 3 is a section view, similar to FIG. 2, for showing a related invention.
Figure 4:
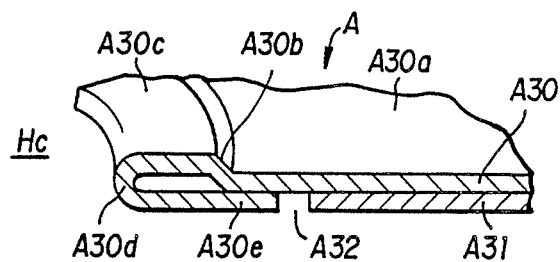
FIG. 4 is a perspective section view of a part of a first embodiment of a steel laminate gasket of the present invention.
Figure 5:
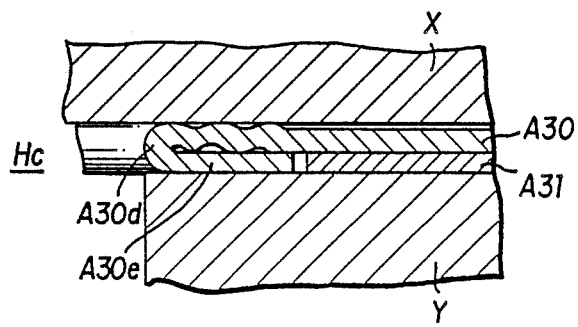
FIG. 5 is an explanatory section view for showing the condition that the gasket of the invention is compressed.

Referring to FIGS. 4 and 5, a first embodiment A of a steel laminate gasket of the present invention is shown. The gasket A as shown in FIGS. 4 and 5 is a cylinder head gasket, similar to FIG. 1, and is provided with a plurality of holes, i.e. cylinder holes Hc, water holes Hw, oil holes Ho and bolt holes Hb. Areas around the cylinder holes Hc are sealed in accordance with the present invention. However, if required, areas around the water holes Hw, oil holes Ho and bolt holes Hb may be sealed as well.

The gasket A comprises an upper plate A30, and a lower plate A31 situated under the upper plate A30. The upper plate A30 is provided with a base portion A30a extending substantially throughout the entire area of the gasket, a diagonal side wall A30b extending diagonally and upwardly from the base portion A30a around the cylinder hole Hc, and an embossed portion A30c. The upper plate A30 also includes a curved portion A30d around the cylinder hole Hc to define the same, and a flange A30e situated under the embossed portion A30c.

The flange A30e is spaced apart from the embossed portion A30c and is situated parallel thereto, so that a space is formed between the flange A30e and the embossed portion A30c. An end portion of the flange A30e is located under the base portion A30a.

When the upper plate A30 is formed, the embossed portion A30c is treated at first. Namely, the diagonal side wall A30b is formed, and then an upper edge of the curved portion A30d is bent. The upper edge of the curved portion may be bent before the diagonal side wall A30b is formed. Then, the flange A30e is turned to be located under the embossed portion A30c, whereby the curved portion A30d is formed.

The lower plate A31 is a flat plate situated under the base portion A30a of the upper plate A30. The lower plate A31 is provided with a hole A32. The diameter of the hole A32 is larger than the outer diameter of the flange A30e.

When the gasket A is assembled, the lower plate A31 is situated under the upper plate A30 so that the flange A30e is located in the hole A32. The lower plate A31 does not pile on the flange A30e.

When the gasket A thus assembled is situated between a cylinder head X and a cylinder block Y and is tightened therebetween as shown in FIG. 5, the embossed portion A30c is compressed. Since the embossed portion A30c is surrounded by the diagonal side wall A30b and the curved portion A30d, the tightening pressure is concentrated at the embossed portion A30c. As a result, a plurality of corrugated beads are formed on the embossed portion A30c.

In the gasket A, since the embossed portion A30c surrounded by the diagonal side wall A30b and the curved portion A30d is relatively wide, relatively wide sealing pressure is formed around the cylinder hole Hc. Namely, the sealing pressure is not concentrated at a narrow area and is evenly spread around the embossed portion A30c. As a result, the sealing characteristics are sufficiently improved. Also, the cylinder head is not damaged by the corrugated beads.

Figure 6:
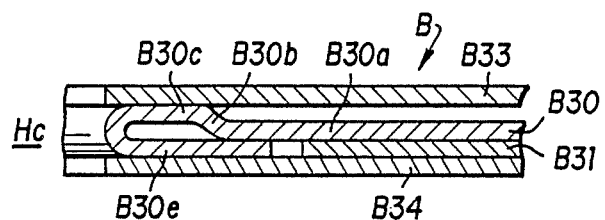
FIGS. 6–12 are section views, similar to FIG. 2, for showing second to eighth embodiments of the gasket of the invention.

FIG. 6 shows a second embodiment B of a steel laminate gasket of the present invention. The gasket B comprises a plate B30 with an embossed portion B30c and a flange B30e, and a plate B31, similar to the gasket A. However, a diagonal side wall B30b is formed to bend gently relative to a base portion B30a and the embossed portion B30c. Since the diagonal side wall B30b is curved gently, it is possible to reduce metal fatigue formed at the plate B30 when the diagonal side wall B30b is formed. As a result, durability at the diagonal side wall B30b is improved. Moreover, the gasket B is provided with an upper outer plate B33, and a lower outer plate B34.

The upper outer plate B33 is provided with an opening corresponding to the cylinder hole Hc and is situated above the plate B30. The lower outer plate B34 is provided with an opening corresponding to the cylinder hole Hc and is situated under the plate B31. In the gasket B, durability is improved. Also, the gasket B is useful when a thick gasket is required.

Figure 7:
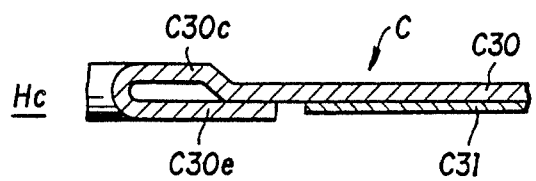

FIG. 7 shows a third embodiment C of a steel laminate gasket of the present invention. The gasket C comprises an upper plate C30 with an embossed portion C30c and a flange C30e, and a lower plate C31, similar to the gasket A. In the gasket C, the thickness of the upper plate C30 is thicker than that of the lower plate C31. As a result, high sealing pressure is obtained around the cylinder hole Hc. The gasket C is useful where high sealing pressure is required.

Figure 8:
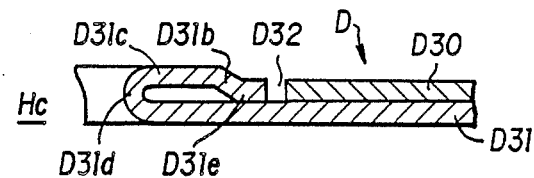

FIG. 8 shows a fourth embodiment D of a steel laminate gasket of the present invention. The gasket D comprises an upper plate D30 with a hole D32, and a lower plate D31 situated under the upper plate D30. The lower plate D31 is provided with a curved portion D31d, and a flange D31e wherein a diagonal side wall D31b and an embossed portion D31c are formed. Namely, while the gasket A is provided with the embossed portion A30c on the base portion A30a, in the gasket D, the embossed portion D31c is formed on the flange D31e.

When the gasket D is assembled, the flange D31e is located in the hole D32 of the upper plate D30. The embossed portion D31c slightly projects outwardly from the upper surface of the upper plate D30. The gasket D operates as in the gasket A.

Figure 9:
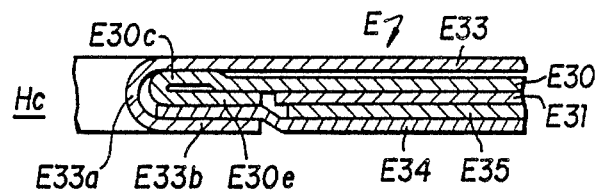

FIG. 9 shows a fifth embodiment E of a steel laminate gasket of the present invention. The gasket E comprises a plate E30 with an embossed portion E30c and a flange E30e, and a plate E31, similar to the gasket A. However, the gasket E further includes an upper outer plate E33, a lower outer plate E34, and a plate E35 situated between the lower outer plate E34 and the plate E31.

The upper outer plate E33 is provided with a curved portion E33a to define the cylinder hole Hc, and a flange E33b situated under a part of the lower outer plate E34. Namely, the plates E30, E31 are completely covered by the outer plates E33, E34. The gasket E is useful in case a thick gasket is required.

Figure 10:
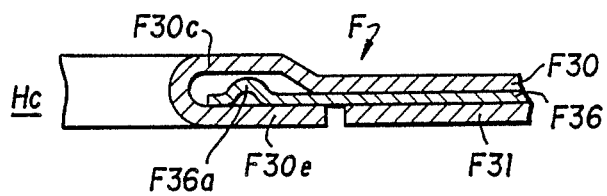

FIG. 10 shows a sixth embodiment F of a steel laminate gasket of the present invention. The gasket F comprises an upper plate F30 with an embossed portion F30c and a flange F30e, and a lower plate F31, similar to the gasket A. However, the gasket F further includes a middle plate F36 situated between the upper plate F30 and the lower plate F31.

The middle plate F36 is provided with a bead F36a around the cylinder hole Hc under the embossed portion F30c to support the same. Therefore, when the gasket F is tightened, the embossed portion F30c, especially the center of the embossed portion F30c, is supported by the bead F36a to thereby provide a high sealing pressure. The gasket F is useful in case high sealing pressure is required.

Figure 11:
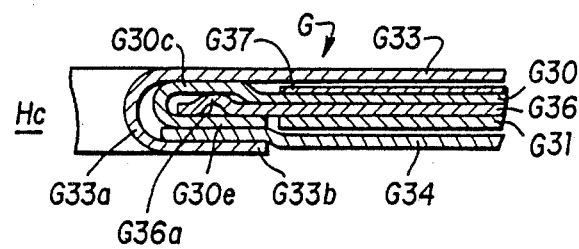

FIG. 11 shows a seventh embodiment G of a steel laminate gasket of the present invention. The gasket G comprises a plate G30 with an embossed portion G30c and a flange G30e, a plate G31, and a plate G36 with a bead G36a, similar to the gasket F. However, the gasket G further includes an upper outer plate G33 situated above the plate G30, a lower outer plate G34 situated under the plate G31, and a plate G37 situated between the plate G33 and the plate G30. The plate G37 operates as a surface pressure regulation plate for the embossed portion G30c and the bead G36a.

The upper outer plate G33 is provided with a curved portion G33a to define the cylinder hole Hc, and a flange G33b situated under a part of the lower outer plate G34. Namely, the plates G30, G31 are completely covered by the plates G33, G34. The gasket G is useful in case a thick gasket with high sealing pressure is required.

Figure 12:
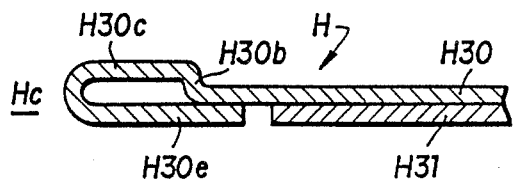

FIG. 12 shows an eighth embodiment H of a steel laminate gasket of the present invention. The gasket H comprises an upper plate H30 with an embossed portion H30c and a flange H30e, and a lower plate H31, similar to the gasket A. In the gasket H, however, the upper plate H30 is provided with a vertical side wall H30b. Since the vertical side wall H30b is stronger than a diagonal side wall, e.g. A30b, against a vertical pressure applied thereto, the embossed portion H30c can provide a strong sealing pressure when the gasket H is tightened. The gasket H is useful when high sealing pressure is required.

In the present invention, the gasket is basically provided with a first plate having a relatively wide embossed portion around a hole to be sealed, and a second plate situated at a flange side of the first plate. Since the embossed portion, when compressed, forms a plurality of corrugated beads, a relatively wide and strong sealing pressure is obtained. Therefore, an area around the hole is securely sealed by the embossed portion.

When a bead is situated under the embossed portion, the embossed portion is supported by the bead. As a result, a part of the embossed portion supported by the bead provides a strong sealing pressure thereat. In the present invention, it is possible to regulate the sealing pressure by the combination of the embossed portion and the supporting bead.

While the invention has been explained with reference to the specific embodiments of the invention, the explanation is illustrative and the invention is limited only by the appended claims.

What is claimed is:

1. A steel laminate gasket for an internal combustion engine having at least one hole therein, comprising,
   a first plate having at least one first hole therein corresponding to the hole of the engine, said first plate including a base portion, at least one curved portion integrally formed with the base portion to extend transversely with respect to the base portion to surround and define the first hole, at least one flange integrally formed with the curved portion and being located at a side of the base portion to extend substantially parallel to the base portion and surrounding the first hole, at least one side wall formed on one of the base portion and the flange spaced from the curved portion to surround the first hole so that the distance between the flange and a portion of said base portion laterally inside the side wall is greater than the distance between the flange and base portion laterally outside the side wall, and an area around the first hole surrounded by the side wall and the curved portion for forming an embossed portion, said embossed portion having a lateral width shorter than the lateral width of the flange and an outer surface which is substantially flat and parallel to an outer surface of one of the base portion and flange facing against the embossed portion so that when the gasket is tightened, the embossed portion deforms to strongly seal around the first hole, and
   a second plate situated at a flange side of the first plate, said second plate having at least one second hole therein, the size of the second hole being larger than the size of the flange so that when the first and second plates are assembled, the flange is located inside the second hole.

2. A steel laminate gasket according to claim 1, in which said embossed portion is constructed so that when the gasket is tightened, the embossed portion forms a plurality of corrugated beads thereat to seal around the first hole.

3. A steel laminate gasket according to claim 2, in which the width of the embossed portion is shorter than that of the flange so that the periphery of the flange touches a portion of the base portion laterally outside the sidewall.

4. A steel laminate gasket according to claim 3, in which the embossed portion is formed on the flange.

5. A steel laminate gasket according to claim 3, in which the thickness of the first and second plates is changed so that the sealing pressure around the first hole is regulated.

6. A steel laminate gasket according to claim 3, further comprising a third plate situated above the first plate, and a fourth plate situated under the second plate, said third and fourth plates protecting the first and second plates, respectively.

7. A steel laminate gasket according to claim 6, in which said third plate includes a curved portion situated laterally inside the curved portion of the first plate, and a flange situated outside a part of the fourth plate.

8. A steel laminate gasket according to claim 3, in which said side wall of the embossed portion is positioned diagonally relative to one of the flange and the base portion.

9. A steel laminate gasket according to claim 8, in which said side wall is formed by gently bending the base portion so that edge lines by bending are not formed.

10. A steel laminate gasket according to claim 3, in which said side wall of the embossed portion is positioned perpendicularly relative to one of the flange and the base portion so that strong surface pressure is formed at the embossed portion adjacent the side wall.

11. A steel laminate gasket according to claim 2, further comprising a fifth plate situated between the first and second plates, said fifth plate having at least one bead adjacent the embossed portion to resiliently support the embossed portion.

12. A steel laminate gasket according to claim 11, further comprising a sixth plate situated outside the embossed portion to operate as a surface pressure regulation plate relative to the embossed portion and the bead.

13. A steel laminate gasket according to claim 1, in which the embossed portion is formed on the base portion.

14. A steel laminate gasket for an internal combustion engine having at least one hole therein, comprising,
   a first plate having at least one first hole therein corresponding to the hole of the engine, said first plate including a base portion, at least one curved portion integrally formed with the base portion to extend transversely with respect to the base portion to surround and define the first hole, at least one flange integrally formed with the curved portion and being located at a side of the base portion to extend substantially parallel to the base portion and surrounding the first hole, at least one side wall formed on one of the base portion and the flange spaced from the curved portion to surround the first hole so that the distance between the flange and a portion of said base portion laterally inside the side wall is greater than the distance between the flange and base portion laterally outside the side wall, and an area around the first hole surrounded by the side wall and the curved portion for forming an embossed portion, said embossed portion having an outer surface which is substantially flat and parallel to an outer surface of one of the base portion and flange facing against the embossed portion so that when the gasket is tightened, the embossed portion forms a plurality of corrugated beads thereat to seal around the first hole, a second plate situated at a flange side of the first plate, said second plate having at least one second hole therein, the size of the second hole being larger than the size of the flange so that when the first and second plates are assembled, the flange is located inside the second hole, a third plate situated between the first and second plates, said third plate having at least one bead adjacent the embossed portion to resiliently support the embossed portion, a fourth plate situated outside the embossed portion to operate as a surface pressure regulation plate relative to the embossed portion and the bead, a fifth plate situated above the fourth plate and having a curved portion situated inside the curved portion of the first plate and a flange, and a sixth plate situated under the second plate, a part of the sixth plate being located between the flange of the fifth plate and the flange of the first plate.

* * * * *